United States Patent [19]

Danneels

[11] Patent Number: 5,923,853
[45] Date of Patent: Jul. 13, 1999

[54] USING DIFFERENT NETWORK ADDRESSES FOR DIFFERENT COMPONENTS OF A NETWORK-BASED PRESENTATION

[75] Inventor: Gunner Danneels, Beaverton, Oreg.

[73] Assignee: Intel Corporation, Santa Clara, Calif.

[21] Appl. No.: 08/547,489

[22] Filed: Oct. 24, 1995

[51] Int. Cl.$^6$ .......................... H04L 12/16; H04L 12/46; G06F 13/00

[52] U.S. Cl. ................. 395/200.68; 395/200.65; 395/200.48; 395/200.75

[58] Field of Search .................... 395/200.09, 200.15, 395/200.16, 762, 774, 200.47, 200.48, 200.49, 200.65, 200.68, 200.75; 370/400, 401, 420, 431, 463

[56] References Cited

U.S. PATENT DOCUMENTS

| | | | |
|---|---|---|---|
| 4,890,321 | 12/1989 | Seth-Smith et al. | 380/20 |
| 4,916,539 | 4/1990 | Galumbeck | 348/467 |
| 5,361,256 | 11/1994 | Doeringer et al. | 370/390 |
| 5,410,698 | 4/1995 | Danneels et al. | 395/685 |
| 5,517,494 | 5/1996 | Green | 370/408 |
| 5,572,643 | 11/1996 | Judson | 395/793 |
| 5,588,003 | 12/1996 | Ohba et al. | 370/468 |
| 5,600,644 | 2/1997 | Chang et al. | 370/404 |
| 5,602,992 | 2/1997 | Danneels | 395/200.78 |
| 5,608,726 | 3/1997 | Virgile | 370/401 |
| 5,619,650 | 4/1997 | Bach et al | 395/200.76 |
| 5,663,951 | 9/1997 | Danneels et al. | 370/230 |
| 5,699,359 | 12/1997 | Suga | 370/395 |
| 5,737,495 | 4/1998 | Adams et al. | 707/104 |
| 5,774,698 | 6/1998 | Olnowich | 395/500 |

OTHER PUBLICATIONS

"Integrating Point–To–Point and Multicast Transport" authored by Jörg Ott and Carsten Bormann, Nov. 1994, 5 pgs.

"Design of a Continuous Media Data Transport Service and Protocol" authored by Mark Moran and Bernd Wolfinger, Apr. 1992, pp. 1–40.

Turletti, T., and Bolot, J.–C., Issues with multicast video distribution in heterogenous packet networks. In Proceedings of the Sixth International Workshop on Packet Video (Portland, OR, Sep. 1994).

M.A. Pike et al. "Using Mosaic" 1994, Que, pp. 208–209.

Primary Examiner—Eddie P. Chan
Assistant Examiner—Hong Kim
Attorney, Agent, or Firm—William H. Murray; N. Stephan Kinsella

[57] ABSTRACT

A presentation is divided into different components. For example, a multimedia presentation may have an audio component and a video component. Each component is assigned a different network address for transmission of the presentation over the network by a server. Each receiver selects those components it wishes to play by selecting the appropriate network addresses. The presentation data is routed through the network based on the selections made by the various receivers. If, for example, one or more receivers are part of a local area network (LAN) separated from the server by a wide area network (WAN) link, and if none of those remote receivers has selected one or more of the presentation components, then the routers will not transmit data for those unselected components to the remote LAN. As a result, WAN link transmission bandwidth is preserved for desired data. In addition, the remote receivers do not have to expend processor time to examine and discard unwanted data.

18 Claims, 3 Drawing Sheets

USING DIFFERENT NETWORK ADDRESSES FOR DIFFERENT COMPONENTS OF A NETWORK-BASED PRESENTATION

CROSS-REFERENCES TO RELATED APPLICATIONS

This is related to U.S. application Ser. No. 08/425,086, now U.S. Pat. No. 5,585,852, filed on Apr. 19, 1995 as Attorney Docket No. 366431-043, the disclosure of which is incorporated in its entirety herein by reference.

BACKGROUND OF THE INVENTION

1. Field of the Invention

The present invention relates to computers, and, in particular, to the transmission of multimedia presentations over computer networks.

2. Description of the Related Art

For certain network-based applications, such as multicasting, data are grouped on network addresses (e.g., multicast addresses) in a content-based manner. That is, data that are part of the same presentation are grouped together on the same network address. For example, in one multimedia multicasting application, a presentation comprising audio and video portions is transmitted over a network from a server to one or more receivers over a computer network, where the server and receivers are nodes of that network. In conventional multicasting, the audio and video portions (i.e., the components of the multimedia presentation) are assigned the same network address for transmission over the network. The network infrastructure routes all of the presentation data to all of the nodes that have joined the multicast group, independent of whether a particular node wants to or even can process all of that data (i.e., all of the components of the presentation). This can lead to inefficient use of the bandwidth available throughout the network.

What is needed is an improved scheme for routing components of network-based presentations. It is accordingly an object of this invention to overcome the disadvantages and drawbacks of the known art and to provide such an improved scheme for routing components of network-based presentations.

Further objects and advantages of this invention will become apparent from the detailed description of a preferred embodiment which follows.

SUMMARY OF THE INVENTION

The present invention comprises computer-implemented processes, apparatuses, and storage mediums encoded with machine-readable computer program code for transmitting presentations over networks. According to a preferred embodiment, a presentation is generated at a server, wherein the presentation comprises two or more components and the server is connected to one or more receivers over a network. A network address is assigned to each of the components, wherein each component has a different network address, and the presentation is transmitted by the server over the network. Each receiver has selected a set of components of the presentation and the components of the presentation are routed to the receivers based on the selected sets of components.

BRIEF DESCRIPTION OF THE DRAWINGS

Other objects, features, and advantages of the present invention will become more fully apparent from the following detailed descriptions of the preferred embodiment, the appended claims, and the accompanying drawings in which:

DESCRIPTION OF THE PREFERRED EMBODIMENT(S)

The present invention is directed to a scheme for transmitting and routing components of presentations over computer networks. According to a preferred embodiment, each component of a presentation is assigned a different network address for transmission over a network by a server (i.e., one of the network nodes). Data for the different presentation components are then routed through the network based on selections of components (i.e., selections of network addresses) made by different receiving nodes of the network.

Figure 1:
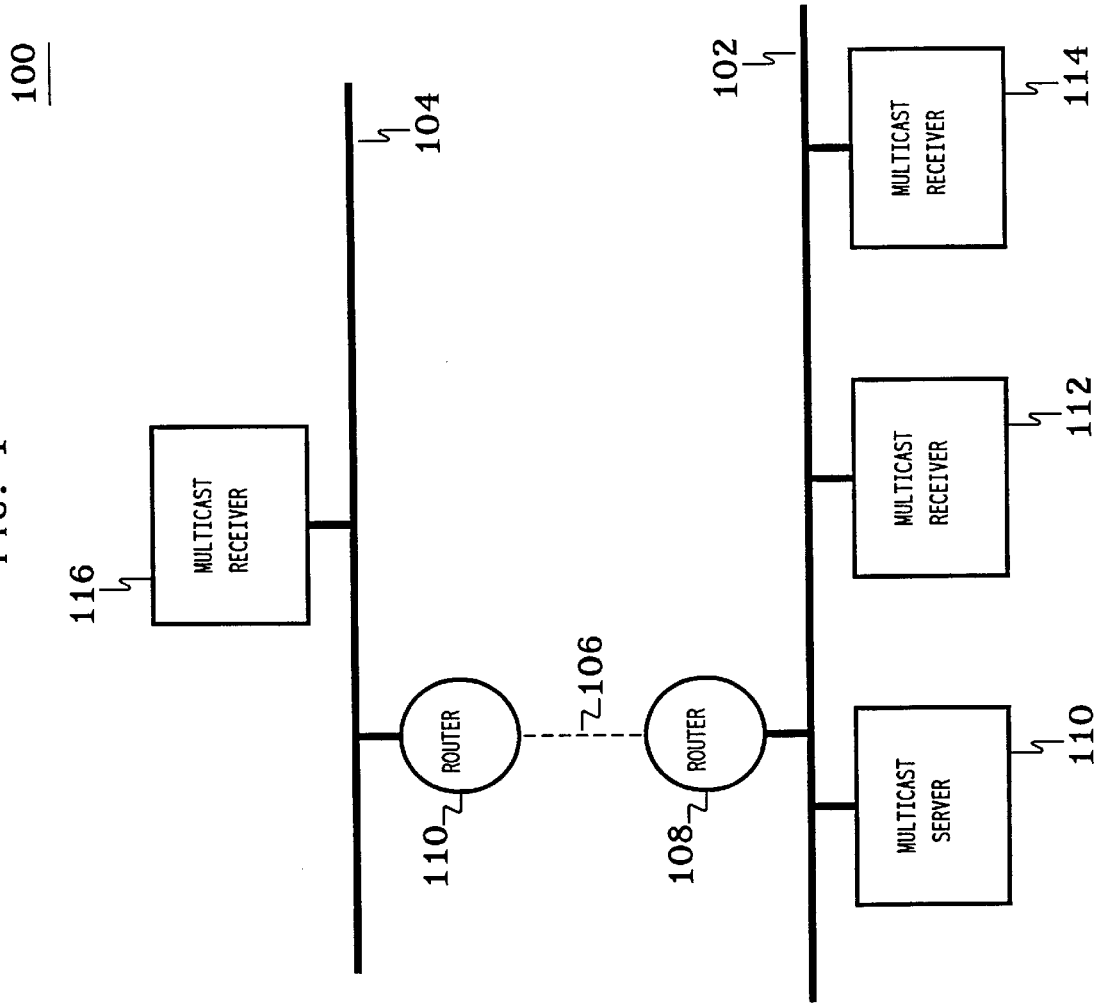
FIG. 1 shows a block diagram of a computer network, according to a preferred embodiment of the present invention.

Referring now to FIG. 1, there is shown a block diagram of a computer network 100, according to a preferred embodiment of the present invention. Computer network 100 is a wide area network (WAN) comprising local area network (LAN) 102 and LAN 104. LANs 102 and 104 are interconnected over WAN link 106. Router 108 of LAN 102 and router 110 of LAN 104 control the transmission of data between LANs 102 and 104 over WAN link 106. LAN 102 also includes three nodes: multicast server 110 and two multicast receivers 112 and 114. Similarly, LAN 104 includes a single node: multicast receiver 116. Multicast server 110 transmits data for a multicast presentation (e.g., comprising audio and video components) over computer network 100 for receipt and playing by multicast receivers 112, 114, and 116.

Under conventional schemes, all of the data for the multicast presentation are assigned to the same network address. A particular that wishes to join the multicast group will receive all of the data for that assigned network address. A particular receiving node may not wish to play all of the parts of the presentation. For example, the presentation may have a video stream, a corresponding French-language audio stream, and a corresponding English-language subtitle stream. The node user may not be interested in playing the subtitle stream. Alternatively, a particular receiving node may be unable to play all of the parts of the presentation. For example, the node may be unable to process the subtitle stream.

Nevertheless, under conventional schemes, all of the data for the multicast presentation are transmitted to each and every receiving node, whether or not the node wants to or even can play all of that data. This is because, under these conventional schemes, all of the data for a presentation are assigned the same network address.

Referring again to FIG. 1, assume that the multicast presentation transmitted by server 110 of LAN 102 comprises a video stream, a corresponding French-language audio stream, and a corresponding English-language subtitle stream. Assume further that the user of receiver 116 of LAN 104 understands French and does not want to play the English subtitle stream. Under conventional schemes, all of the presentation data are assigned the same network address. As a result, all of the data, including that for the subtitle stream, are transmitted by router 108 over WAN link 106 to router 110 for transmission to receiver 116. Receiver 116 will then have to determine which portion of the presentation data corresponds to the subtitle stream and then discard that data. Even though the subtitle data is not even wanted by the user of receiver 116, it is still transmitted from LAN 102 to LAN 104 over WAN link 106. This results in inefficient use of what may be limited transmission bandwidth available over WAN link 106, especially in a multicasting application with lots of audio and video data to transmit.

According to a preferred embodiment of the present invention, however, different components of a presentation are assigned different network addresses. For example, in the present example, the video component, audio component, and subtitle component of the presentation are all assigned different network addresses. Each multicast receiver that wishes to join the multicast group is free to select the set of components that it is interested in playing by selecting the corresponding network addresses and registering those selections with the network infrastructure (e.g., the routers). If receiver 116 is the only receiving node on LAN 104 for this presentation and if the user of receiver 116 does not wish to play the subtitle component of the presentation, then receiver 116 will select and register only the network addresses that correspond to the video and audio components of the presentation. Receiver 116 registers its selections with router 110, which then informs router 108 of the network addresses selected by the nodes of LAN 104. Router 108 will recognize that the network address corresponding to the subtitle component has not been selected by any node of LAN 104 and will therefore not transmit that component of the presentation over WAN link 106. As a result, the potentially limited transmission bandwidth of WAN link 106 is efficiently used for only those components of the presentation that are selected by nodes of LAN 104.

Figure 2:
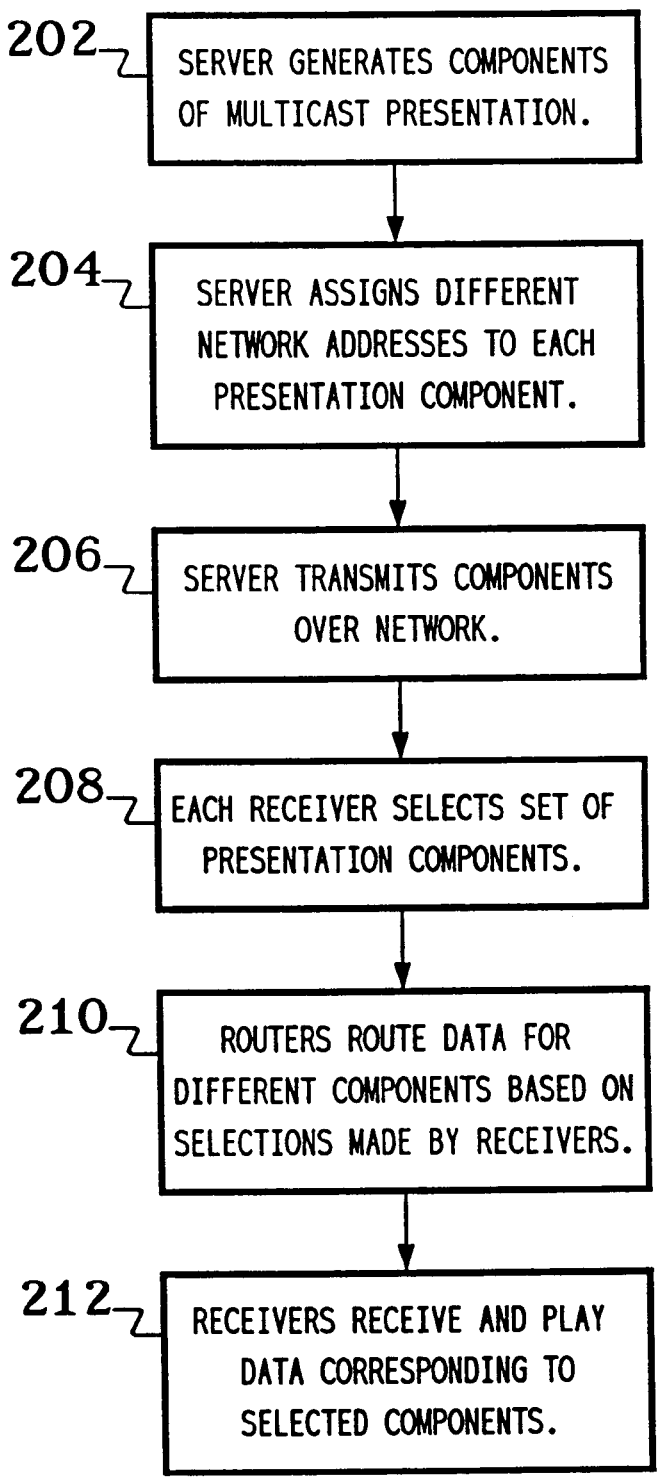
FIG. 2 shows a flow diagram of the processing implemented by the computer network of FIG. 1.
Figure 3:
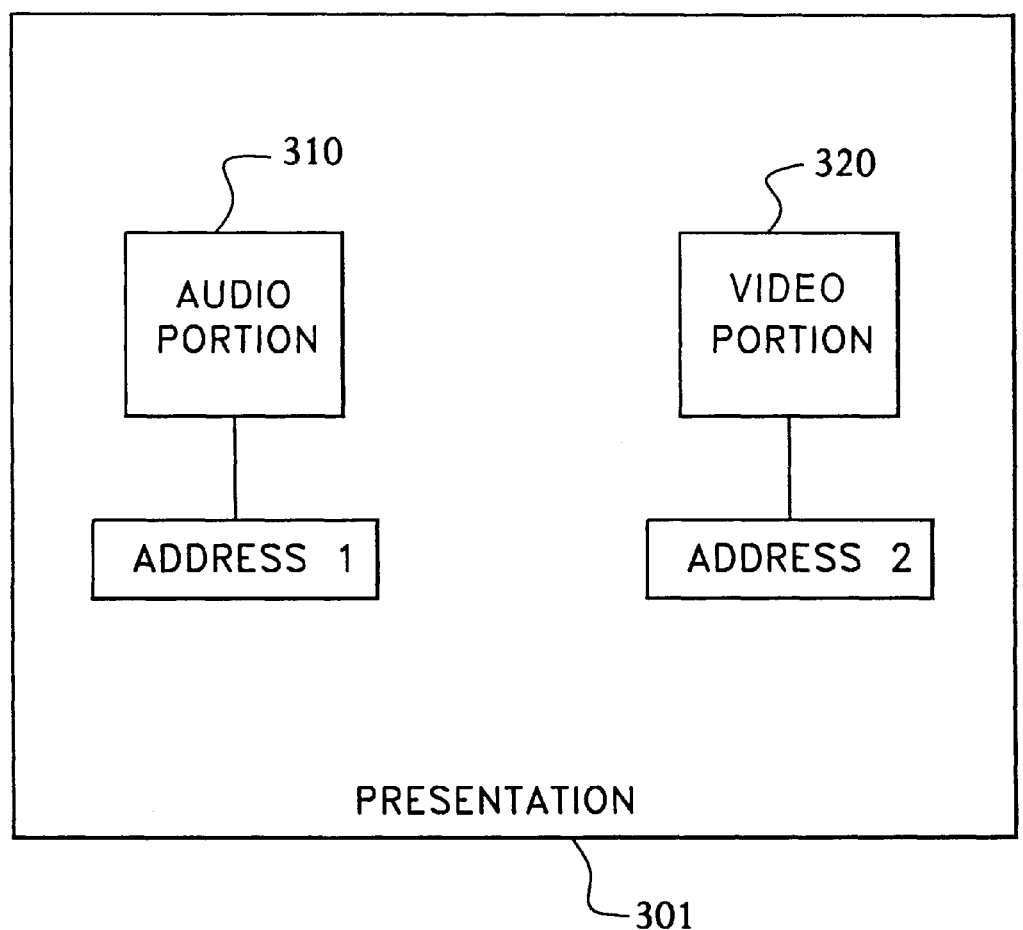
FIG. 3 is a block diagram of a presentation having audio and video portions implemented by the computer network of FIG. 1, in accordance with an embodiment of the present invention.

Referring now to FIG. 2, there is shown a flow diagram of the processing implemented within network 100, according to a preferred embodiment of the present invention. Referring now to FIG. 3, there is shown a block diagram of a presentation 300 having audio and video portions 310, 320 implemented by computer network 100 of FIG. 1, in accordance with an embodiment of the present invention. As illustrated in FIG. 3, audio portion 310 is assigned network address "Address 1" and video portion 320 is assigned a different network address, "Address 2". Referring once more to FIG. 1, server 110 of FIG. 1 generates the different components of a multicast presentation (step 202 of FIG. 2). Server 110 assigns a different network address to each presentation component (step 204) and transmits the data for the components over the network (step 206).

Each receiver 112, 114, 116 that wishes to join the multicast group selects the network addresses that correspond to those components of the presentation that it wishes to play (step 208). Routers 108 and 110 route the data for the different components based on the selections made by the receivers (step 210) and each of the receivers receives and plays only the component data corresponding to the components that it has selected (step 212).

Those skilled in the art will understand that a receiver may still need to discriminate between the data that it receives and the data that it plays. For example, if receiver 112 selects all of the presentation components and receiver 114 selects only a subset of those components, all of the presentation data will still be transmitted over LAN 102 and receiver 114 will need to determine which data to discard. Similarly, even if receiver 116 selects only a subset of the presentation components, if LAN 104 has another receiver (not shown) that selects all of the components, then all of the component data will still need to be transmitted over WAN link 106.

In the example described above, the user of receiver 116 did not want to play all of the presentation data. In an alternative embodiment, receiver 116 may not be able to play all of that data. For example, it may not have the capability for playing a subtitle component of a presentation.

The present invention allows presentations to have either cumulative components or redundant components, or both. A cumulative component is a unique portion of the presentation that can be played independent of any other component, while a redundant component exists when there are two or more other components that represent the same data. For example, a single video component and a single corresponding audio component are cumulative components of a presentation. Each may be played independent of the other or at the same time. They may be correlated (e.g., by timestamps) for synchronization of playback, but they are distinct portions of the whole presentation.

On the other hand, a presentation may have two or more redundant components corresponding to the same portion of the presentation. For example, the video portion of a presentation may be encoded using two or more encoding schemes. Each stream of video data encoded using a different encoding scheme corresponds to a different component of the presentation and is assigned a different network address. A receiver would typically select (at most) only one of these redundant components for receipt and playing. For example, some of the receivers of a network may support video encoded using only a first encoding standard, while others may support video encoded using only a second encoding standard. Each receiver selects only the video component that it is able to play. It will be understood that audio portions (and other portions) of presentations may also be represented by redundant components, using different audio encoding schemes, for example, raw PCM stereo data, PCM mono data, compressed stereo data, and compressed mono data.

The present invention may also be used in conjunction with the playback scalability described in U.S. patent application Ser. No. 08/425,086, filed on Apr. 19, 1995 as Attorney Docket No. 366431-043, the disclosure of which has been incorporated in its entirety herein by reference. In accordance with playback scalability, the video portion, for example, of a presentation is encoded as one or more independent bands of video data. Video playback can be performed by selecting all of the bands or only a subset of the bands. In this way, video playback can be scaled to meet the transmission bandwidth limitations of the network (or, alternatively, the playback processing limitations of the receiving node). For example, if WAN link 106 is of limited bandwidth, receiver 116 is able to select a subset of the bands for receipt and playing where each of the bands of video data is assigned a different network address. Such bands of video data are another example of cumulative components of a presentation.

There are also applications for the present invention in interactive applications, such as multicast video games. As different players progress or move through the video game at different rates or in different directions, different components can be selected for receipt and playing by the different receiving nodes. For example, some slower players may be on the first floor of a castle, while others may have progressed to the second floor. The present invention can be used to assign different network addresses to the different floors and transmit the appropriate components to the different players' nodes. In general, the present invention can be used in applications where different actions taken by a user can determine and change in real time which components of the presentation are selected for receipt and playing.

So far, the present invention has been described in terms of multicasting applications. Those skilled in the art will understand that the present invention may be used in other network-based applications as well, such as broadcasting and conferencing (either point-to-point or multipoint). In conferencing, each participating node acts as a server for a presentation consisting of that node's contribution to the conference. All of the other nodes participating in the conference act as receivers for that first node's presentation. Each of these other nodes may select from among the different network addresses assigned to the different components of the first node's presentation. At the same time, those other nodes may act as servers for their own presentations contributed to the conference as well as receivers of other nodes' presentations.

In general, the present invention can be used to provide more efficient use of limited transmission bandwidth resources within networks. It can also result in decreased processing overhead for the receiving nodes. If presentation data for one or more component that are not selected by a receiver are not transmitted to that receiver, then the receiver will not have the processing overhead of recognizing and discarding those data corresponding to components that are not played.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for transmitting presentations over a network, comprising the steps of:
   (a) generating a presentation at a server, wherein the presentation comprises two or more components and the server is connected to one or more receivers over the network, the network comprising a plurality of routers, wherein two or more of the components correspond to parts of a same portion of the presentation in a cumulative manner;
   (b) assigning a network address to each of the components, wherein each component has a different network address;
   (c) selecting, with each receiver, a unique set of components of the presentation for said each receiver based on the components of the presentation that said each receiver is interested in playing, and registering with a router of the network, for each said receiver, the selection of the unique set of components selected by said each receiver; and
   (d) transmitting the presentation by the server over the network to the receivers by routing to said each receiver only the components corresponding to the unique set of components selected by said each receiver.

2. The process of claim 1, wherein:
the server is part of a first local area network (LAN);
one or more of the receivers are part of a second LAN;
the first and second LANs are interconnected over a wide area network (WAN); and
a first component of the presentation is not routed from the first LAN to the second LAN over the WAN when none of the receivers of the second LAN has selected the first component.

3. The process of claim 1, wherein the presentation comprises one or more audio components and one or more video components, wherein each of the audio and video components is assigned a different network address.

4. The process of claim 1, wherein:
two or more of the components correspond to a same portion of the presentation in a redundant manner; and
each receiver selects one of the redundant components.

5. The process of claim 1, wherein each receiver selects zero, one, or more of the cumulative components.

6. The process of claim 5, wherein the cumulative components correspond to different parts of a video portion of the presentation.

7. An apparatus for transmitting presentations over a network, comprising:
   (a) means for generating a presentation at a server, wherein the presentation comprises two or more components and the server is connected to one or more receivers over the network, the network comprising a plurality of routers, wherein two or more of the components correspond to parts of a same portion of the presentation in a cumulative manner;
   (b) means for assigning a network address to each of the components, wherein each component has a different network address, wherein each receiver comprises means for selecting a unique set of components of the presentation for said each receiver based on the components of the presentation that said each receiver is interested in playing, and said each receiver further comprises means for registering with a router of the network, for each said receiver, the selection of the unique set of components selected by said each receiver; and
   (c) means for transmitting the presentation by the server over the network to the receivers by routing to said each receiver only the components corresponding to the unique set of components selected by said each receiver.

8. The apparatus of claim 7, wherein:
the server is part of a first local area network (LAN);
one or more of the receivers are part of a second LAN;
the first and second LANs are interconnected over a wide area network (WAN); and
a first component of the presentation is not routed from the first LAN to the second LAN over the WAN when none of the receivers of the second LAN has selected the first component.

9. The apparatus of claim 7, wherein the presentation comprises one or more audio components and one or more video components, wherein each of the audio and video components is assigned a different network address.

10. The apparatus of claim 7, wherein:

two or more of the components correspond to a same portion of the presentation in a redundant manner; and each receiver selects one of the redundant components.

11. The apparatus of claim 7, wherein each receiver selects zero, one, or more of the cumulative components.

12. The apparatus of claim 11, wherein the cumulative components correspond to different parts of a video portion of the presentation.

13. A storage medium having stored thereon a plurality of instructions for transmitting presentations over a network, wherein the plurality of instructions, when executed by a processor of a presentation server of the network, cause the presentation server to perform the steps of:

(a) generating a presentation at a server, wherein the presentation comprises two or more components and the server is connected to one or more receivers over the network, the network comprising a plurality of routers, wherein two or more of the components correspond to parts of a same portion of the presentation in a cumulative manner;

(b) assigning a network address to each of the components, wherein each component has a different network address, wherein each component has a different network address, wherein each receiver comprises means for selecting a unique set of components of the presentation for said each receiver based on the components of the presentation that said each receiver is interested in playing, and said each receiver further comprises means for registering with a router of the network, for each said receiver, the selection of the unique set of components selected by said each receiver; and (c) transmitting the presentation over the network to the receivers by routing to said each receiver only the components corresponding to the unique set of components selected by said each receiver.

14. The storage medium of claim 13, wherein:

the server is part of a first local area network (LAN);

one or more of the receivers are part of a second LAN;

the first and second LANs are interconnected over a wide area network (WAN); and a first component of the presentation is not routed from the first LAN to the second LAN over the WAN when none of the receivers of the second LAN has selected the first component.

15. The storage medium of claim 13, wherein the presentation comprises one or more audio components and one or more video components, wherein each of the audio and video components is assigned a different network address.

16. The storage medium of claim 13, wherein:

two or more of the components correspond to a same portion of the presentation in a redundant manner; and each receiver selects one of the redundant components.

17. The storage medium of claim 13, wherein:

two or more of the components correspond to parts of a same portion of the presentation in a cumulative manner; and each receiver selects zero, one, or more of the cumulative components.

18. The storage medium of claim 17, wherein the cumulative components correspond to different parts of a video portion of the presentation.

* * * * *